Figure 1:
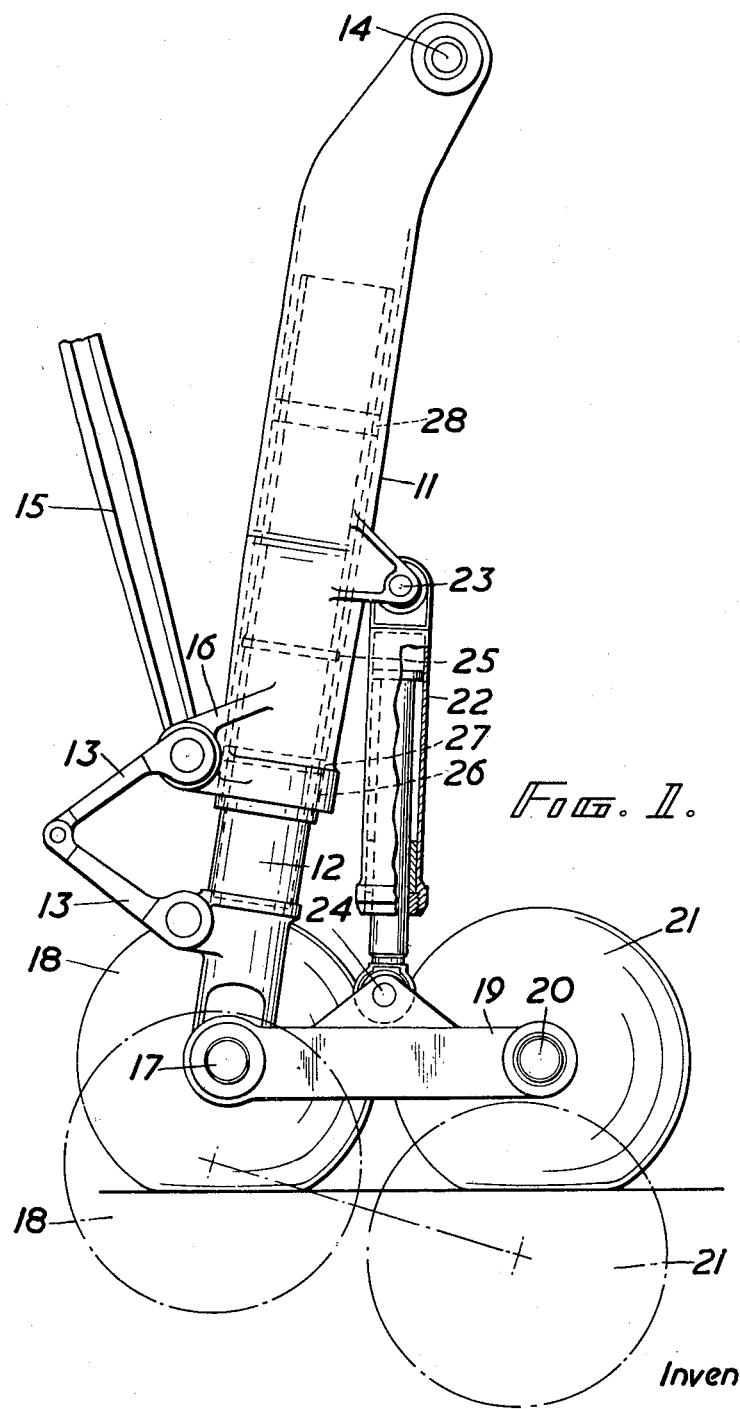

Jan. 17, 1956 P. BONAR 2,731,218
AIRCRAFT ALIGHTING GEAR
Filed Nov. 1, 1950 2 Sheets-Sheet 1

Inventor
*Patrick Bonar,*
BY
*Reynolds, Beach & Christensen*
Attorneys

United States Patent Office 2,731,218
Patented Jan. 17, 1956

2,731,218

AIRCRAFT ALIGHTING GEAR

Patrick Bonar, Cheltenham, England, assignor to Dowty Equipment Limited, Cheltenham, England Application November 1, 1950, Serial No. 193,366

Claims priority, application Great Britain November 10, 1949

6 Claims. (Cl. 244—104)

Multi-wheeled or bogie undercarriages are fitted to many of the larger and heavier types of aircraft in order that the aircraft's weight shall be more widely distributed over the runway. It is extremely difficult for a pilot to land a machine with consistency at such an attitude that all the landing wheels touch down at the same instant, and indeed it is not considered altogether desirable that such landings should be made, owing to the high drag loading which occurs on touch down when the wheels have to be spun up to a speed equalling the forward speed of the aircraft. Some bogie undercarriages have therefore been constructed with the deliberate intention of arranging for one set of wheels (usually the trailing wheels) to touch down before the other set. During the interval between touch down of the two sets of wheels the bogie swings about its pivotal attachment with the main supporting pillar or leg and against shock absorber resistance.

The present invention seeks to provide an improved multi-wheeled undercarriage arranged for one set of wheels to touch down before the other set, and, according to this invention, the lower part of a pillar or leg, which preferably telescopes freely relative to the complemental upper part, carries one of the sets of landing wheels and also one end of a lever carrying the other set of wheels, with shock absorber means extending between an intermediate point on the lever and the pillar or leg. When an aircraft to which such undercarriage is attached is airborne and the undercarriage is lowered, the telescopic leg will be fully extended and it is arranged that the set of wheels carried by the lever will occupy a lower position than the set of wheels carried by the leg. Thus as the aircraft lands, the set of wheels carried by the lever will be first to touch down, and the lever will be swung against the resistance afforded by the shock absorber means until all the wheels are grounded. Once this condition is reached, the telescopic leg will be caused to contract against shock absorber resistance under the remaining landing loads. Such shock absorber resistance may be afforded primarily or solely by the shock absorber means extending between the intermediate point on the lever and the fixed upper part of the leg.

The expression "set of wheels" as used in defining this invention is to be read as meaning one or more wheels rotatable about a single axis.

An important advantage of the invention is that when one set of wheels first touches down, swinging of the lever carrying this set can not impart any downward movement to the other set carried by the fully extended leg. The set of wheels carried by the leg will therefore touch down due only to the downward velocity of the aircraft, instead of at an increased velocity as has been the case with known bogie undercarriages of the general design to which the invention relates. The tyres of these wheels are relieved of unnecessary loads.

Figure 2:
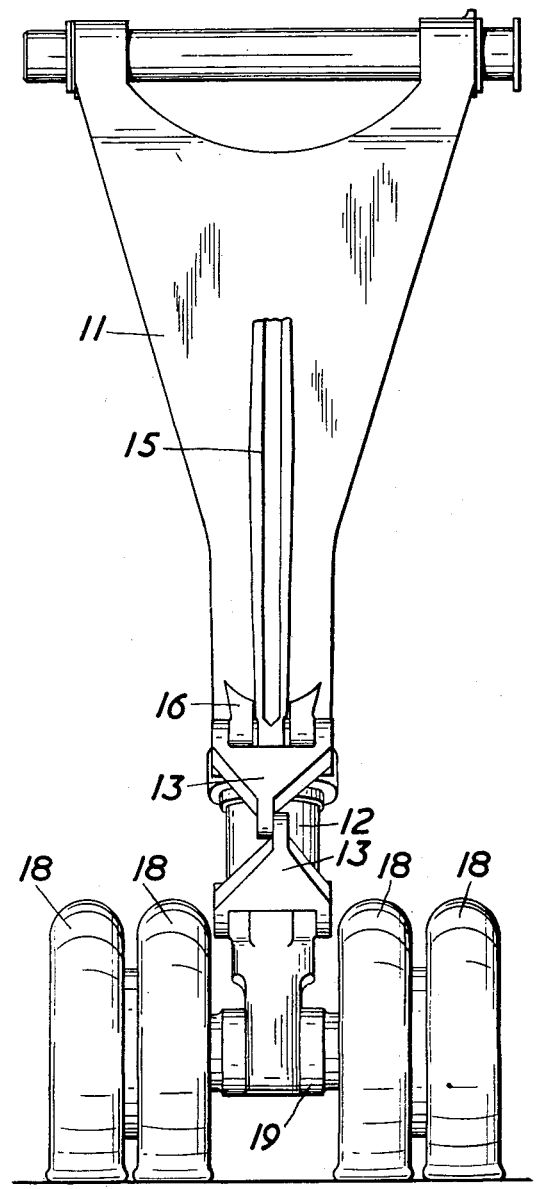

One form of aircraft multi-wheeled undercarriage in accordance with the invention will now be described by way of example with reference to the accompanying diagrammatic drawings, of which:

Figure 1 is a side elevation; and
Figure 2 is a corresponding front end elevation.

The principle underlying this invention involves the pivotal mounting of a generally longitudinally directed lever, such as 19, by one of its ends upon the slidable lower part, as 12, of a telescopic main supporting leg of the undercarriage, so that when the aircraft is airborne not only can the pivoted end of the lever drop by gravity or other force to a lower limit or stopped position, as determined for example by stops cooperating between the fixed part 11 and the slidable part 12 of the leg, but also its swinging end can drop under the influence of similar forces to a still lower limit position. While airborne, assuming the undercarriage is in landing position, the lever is therefore inclined downwardly from its pivoted end, as illustrated in broken lines in Figure 1, and usually, although not necessarily, rearwardly thence.

A set of wheels journaled at or near the lever's pivoted end will be located higher than a like set of wheels journaled at or near its swinging end, and the latter set will touch down before the higher set will touch down. Nevertheless, both sets will move upwardly as the ground load is assumed by the two sets of wheels, and the arrangement is such that when the aircraft is at rest its weight is distributed, usually equally, between the forward and the rear sets of wheels (it is immaterial whether the rear set be the lower, as shown, or vice versa), and these two sets are, of course, level one with the other, and both nearer the fixed part of the leg than was either set when airborne. Shock absorber means correctly designed and located, reacting, in general terms, between the fixed part of the leg and the lever, permits and limits this bodily upward movement of the lever and the upward pivotal movement of its swinging end.

It is not necessary that more than a single shock absorber be employed, but in any case the point of reaction of this sole shock absorber, or of a shock absorber, with the lever, in the form of a pivotal connection, is so located intermediate the axes of the forward and rear sets of wheels as to effect the desired distribution of the load. Most importantly, the arrangement is such that, notwithstanding such an intermediate point of reaction, the prior touching down of the lower set of wheels will not by torque reaction about the intermediate pivotal connection produce a downward movement of the upper set of wheels. This is the result of the limiting of the free downward movement of the slidable part 12 of the leg relative to the fixed part 11, by effective contact between the stops 25 and 26. Such movement of the two sets of wheels as results from touching down is upward, the lower set, first touching down, moving upwardly while the upper set remains in place, until both sets have touched down, after which both sets move upwardly together, until the force is fully absorbed by the shock absorber means, and the load is correctly distributed between the two sets of wheels.

The undercarriage shown has a main supporting telescopic leg comprising an upper fixed part 11 and a lower slidable part 12. The parts 11 and 12 of the leg are prevented from turning relatively to one another by a pair of torque links 13. The upper part 11 of the leg is adapted to be pivotally attached to the aircraft structure about a retraction axis 14, and retracting mechanism, part of which is indicated at 15, is connected to a lug 16 at the lower end of the part 11. The spindle 17 of a leading set of landing wheels 18 is supported in the lower end of the slidable part 12 of the main supporting leg, and there is journalled around the spindle 17 the forward end of a rearwardly extending lever 19 at the rear end of which is supported the spindle 20 of a trailing set of wheels 21. The assembly includes at least one shock absorber, of any known or convenient type, reacting between the spindles 17 and 20 and the upper fixed part 11 of the leg. The form illustrated includes only the single telescopic shock absorber 22 extending between a pivotal connection 23 with part 11 of the leg and a pivotal connection 24 with the lever 19, at a point intermediate the spindles 17 and 20. The point of connection 24 of the shock absorber with the lever is preferably so chosen that all the landing wheels carry equal loads when the aircraft is at rest. If, as in the example illustrated, there are an equal number of similar wheels in each of the leading and trailing sets of wheels, and if the shock absorber 22 constitutes the sole shock absorber means of the undercarriage, the axis of the shock absorber will preferably intersect the plane containing the axes of the leading and trailing wheels half way between these axes, and be approximately perpendicular to such plane when the aircraft is at rest.

The lower slidable part 12 of the main supporting leg is limited at least in its downward movement within the upper part 11 by a ledge 25 on the part 12 engaging a flange 26 of the part 11. A resilient washer 27 is preferably located above the flange 26 to serve as a buffer. An upper slide bearing 28 for the part 12 of the leg may also be fitted in the part 11 of the leg.

The various parts of the undercarriage are shown in full lines in the positions they occupy when the undercarriage is serving to take the weight of the aircraft. The main supporting leg 11, 12 is shortened and the shock absorber 22 is thus to some extent compressed. Upon the aircraft becoming airborne the weight of the parts suspended from the fixed part 11 of the leg and the tendency for the shock absorber to extend will cause the leg and shock absorber to become fully extended. The ledge 25 will rest upon the flange 26, through the buffer 27, limiting extension of the leg to a value less than the permitted extension of the shock absorber. The leading and trailing sets of wheels then occupy the positions shown by broken lines in Figure 1. It will be seen that the trailing set of wheels 21 are lower than the leading set 18 so that when the aircraft comes in to land the trailing set 21 will be first to touch down. Touch down of the wheels 21 will cause the lever 19 to swing up about its pivotal attachment with the main supporting leg and against the resistance offered by the shock absorber. Such swinging of the lever 19 will not impart any downward movement to the leading wheels 18, for ledge 25 is now resting on flange 26, or its buffer 27; the wheels 18 will therefore engage the landing surface at a downward velocity due solely to the downward velocity of the aircraft. The leading wheels are thus relieved of unnecessary loadings, and the initial drag loadings of the trailing and leading wheels occur at slightly different times. After both wheels 18 and 21 touch down, they rise conjointly, each assuming its share of the load, until the shock absorber 22 has absorbed the entire force of touching down.

The invention is not limited to the particular arrangement shown in the drawings, for example the lever 19 need not necessarily be journalled about the spindle 17 of the leading wheels; it could be journalled on a lug at the lower part of the leg. Also, if desired, the arrangement may be such that the leading wheels are first to touch down in which case the lever 19 would extend forwardly and downwardly from its attachment to the undercarriage leg.

I claim:

1. A component of aircraft alighting gear comprising a two-part telescopic leg having a lower part freely slidable relative to a fixed upper part, a first wheel journalled to the lower part of said leg, a lever pivotally attached to the lower part of said leg, a second wheel journalled to the end of the lever remote from said leg, and shock absorber means extensible to and compressible from a lower limit position, and operatively connected between the fixed upper part of said leg and a location on said lever between the journals of said wheels, said shock absorber means being of a capacity when the aircraft is groundborne to wholly support the ground load, and being adapted in association with the telescopic leg when the aircraft is airborne and the leg fully extended to maintain the second wheel at a lower level than the first wheel.

2. A component of aircraft alighting gear comprising a two-part telescopic leg, the lower part whereof is freely slidable relative to the fixed upper part, upwardly from a lower limit position, and downwardly to that limit position, a spindle mounted on said lower part, a leading wheel rotatively mounted on said spindle, a lever one end whereof is oscillatably mounted on said spindle, and which lever extends thence rearwardly, a trailing wheel rotatively mounted on the rear end of said lever, a compressible and extensible ground-load sustaining shock absorber operatively interposed between the fixed upper part of said leg and said lever, at a point so located that, when the shock absorber is fully extended and the leg's lower part is in its lower limit position, the trailing wheel will be lower than the leading wheel.

3. In an aircraft alighting gear, in combination with a generally upright landing leg formed of a fixed upper and a slidable lower part relatively telescopingly interconnected, complemental stop means carried by said parts and interengageable to limit downward movement of the lower part relative to the upper, a lever pivotally mounted near one end upon the lower leg part to tilt about an axis extending transversely of said lever, a first wheel journalled about said axis, a second wheel journalled upon the lever towards its swinging end, and swingable with said lever, and shock absorber means operatively interconnecting and reacting between said fixed part of the leg and the lever at a point intermediate the first and second wheels, to yieldingly resist upward swinging movement of the lever and the second wheel about the lever's pivotal mount upon the lower leg part, and to resist bodily upward movement of the lever and both wheels, with the lower leg part, relative to the upper leg part, said shock absorber means including means extensible to and compressible from a lower limit position, to limit downswinging of the lever to a position wherein, when the aircraft is airborne and said stop means are interengaged, the second wheel is sufficiently lower than the first wheel that the second wheel will touch down first, and will swing upwardly with the lever, and thereafter upon touching down also of the first wheel both wheels will rise bodily relative to the upper leg part, in both instances against the resistance of said shock absorber means.

4. A component of aircraft alighting gear comprising a two-part telescoping leg having a lower member freely slidable relative to a fixed upper part, a lever member having one end portion pivotally attached to said leg lower member, a first wheel journaled to one of said members, a second wheel journaled to said lever member at a location remote from said leg, and shock absorber means extensible to and compressible from a lower limit position and operatively connected between the fixed upper part of said leg and a location on said lever member intermediate its ends, said shock absorber means being of a capacity when the aircraft is ground-borne to wholly support the ground load and being adapted in association with the telescoping leg when the aircraft is airborne and the leg fully extended to maintain the second wheel lower than the first wheel.

5. An aircraft landing gear comprising linkage means, said means including a two-part, generally upright telescopic leg, said leg having a lower part slidable relative to an upper part, a generally horizontally disposed lever having one end portion pivotally connected to said lower part of said leg, a two-part, generally upright shock absorber means pivotally connected at its upper end to said upper part of said leg and at its lower end to an intermediate point of said lever, a ground engaging wheel rotatably mounted on said linkage means at a location on the same side of said shock absorber means as said leg, and a ground engaging wheel rotatably mounted on said lever on the side of said shock absorber means opposite from said leg.

6. An aircraft landing gear comprising linkage means, said means including a two-part, generally upright telescopic device, said telescopic device having a lower part and an upper part slidable relatively, a generally horizontally disposed lever having one end portion pivotally connected to said lower part of said telescopic device, a two-part, generally upright shock absorber device including an upper part and a lower part and having its upper part pivotally connected to said upper part of said telescopic device and its lower part pivotally connected to an intermediate point of said lever, one of said devices extending upwardly beyond the pivotal connection of said devices for supporting engagement with the aircraft, a first ground engaging wheel rotatably mounted on said linkage means at a location on the same side of said shock absorber device as said telescopic device, and a second ground engaging wheel rotatably mounted on said lever on the side of said shock absorber device opposite from said telescopic device, said upper and lower parts of said telescopic device being freely slidable relatively and operable to limit downward movement of the connection of said lever to said telescopic device relative to the connection of said shock absorber device to said lever, when the aircraft is airborne, to dispose said second wheel lower than said first wheel for contact of said second wheel with the ground before said first wheel.

References Cited in the file of this patent
UNITED STATES PATENTS

| | | |
|---|---|---|
| 1,379,576 | Killen | May 24, 1921 |
| 1,852,230 | Breguet | Apr. 5, 1932 |
| 2,281,351 | Dowty | Apr. 28, 1942 |
| 2,396,318 | De Bell | Mar. 12, 1946 |
| 2,433,830 | Dowty | Jan. 6, 1948 |
| 2,490,485 | Spaeth | Dec. 6, 1949 |